US009225959B2

United States Patent
Choi et al.

(10) Patent No.: US 9,225,959 B2
(45) Date of Patent: Dec. 29, 2015

(54) METHOD AND APPARATUS FOR RECOVERING DEPTH VALUE OF DEPTH IMAGE

(71) Applicant: SAMSUNG ELECTRONICS CO., LTD., Suwon-si, Gyeonggi-do (KR)

(72) Inventors: Ouk Choi, Yongin-si (KR); Seung Kyu Lee, Seoul (KR); Kee Chang Lee, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 437 days.

(21) Appl. No.: 13/736,463

(22) Filed: Jan. 8, 2013

(65) Prior Publication Data

US 2013/0176391 A1  Jul. 11, 2013

Related U.S. Application Data

(60) Provisional application No. 61/584,925, filed on Jan. 10, 2012.

(30) Foreign Application Priority Data

Aug. 27, 2012 (KR) .................. 10-2012-0093530

(51) Int. Cl.
| | |
|---|---|
| *H04N 13/00* | (2006.01) |
| *H04N 15/00* | (2006.01) |
| *G06T 7/00* | (2006.01) |
| *G01S 17/08* | (2006.01) |
| *G01S 17/89* | (2006.01) |

(52) U.S. Cl.
CPC ............ *H04N 13/0007* (2013.01); *G01S 17/08* (2013.01); *G01S 17/89* (2013.01); *G06T 7/0065* (2013.01); *G06T 2207/10028* (2013.01); *G06T 2207/20076* (2013.01)

(58) Field of Classification Search
None
See application file for complete search history.

(56) References Cited

U.S. PATENT DOCUMENTS

| 8,760,500 | B1 * | 6/2014 | Gallup et al. .................. 348/46 |
| 2009/0183125 | A1 * | 7/2009 | Magal et al. .................. 715/863 |
| 2010/0265316 | A1 * | 10/2010 | Sali et al. ...................... 348/46 |
| 2011/0025827 | A1 * | 2/2011 | Shpunt et al. ................. 348/47 |
| 2011/0175983 | A1 * | 7/2011 | Park et al. .................... 348/46 |
| 2012/0242794 | A1 * | 9/2012 | Park et al. .................... 348/46 |
| 2012/0287247 | A1 * | 11/2012 | Stenger et al. ................ 348/47 |

FOREIGN PATENT DOCUMENTS

| JP | 2008-116309 | 5/2008 |
| JP | 2009-139995 | 6/2009 |
| JP | 2010-239290 | 10/2010 |
| JP | 2011-013993 | 1/2011 |

* cited by examiner

*Primary Examiner* — Joseph Ustaris
*Assistant Examiner* — Talha Nawaz
(74) *Attorney, Agent, or Firm* — Harness, Dickey & Pierce, P.L.C.

(57) ABSTRACT

A method and apparatus for processing a depth image determines a number of mods (NoM) for corresponding pixels in a plurality of depth images. The corresponding pixels may represent a same three-dimensional (3D) point. The NoM may be determined to be a value for minimizing a Markov random field (MRF) energy. A depth value for one depth image may be recovered, and a depth value for another depth image may be updated using the recovered depth value.

22 Claims, 7 Drawing Sheets

METHOD AND APPARATUS FOR RECOVERING DEPTH VALUE OF DEPTH IMAGE

CROSS-REFERENCE TO RELATED APPLICATIONS

This application claims the priority benefit under 35 U.S.C. §119(e) of U.S. Provisional Application No. 61/584,925, filed on Jan. 10, 2012, in the U.S. Patent and Trademark Office, and under 35 U.S.C. §119(a) of Korean Patent Application No. 10-2012-0093530, filed on Aug. 27, 2012, in the Korean Intellectual Property Office, the entire disclosures of which are hereby incorporated by reference.

BACKGROUND

1. Field

Example embodiments relate to a method and apparatus for recovering a depth value of a depth image, and more particularly, to a method and apparatus for calculating a depth value of a pixel in a depth image taken with a Time-of-Flight (ToF) depth camera.

2. Description of the Related Art

A Time-of-Flight (ToF) depth camera provides two-and-a-half-dimensional (2.5D) information of a scene. Here, 2.5D refers to a method of providing depth information for a visible surface.

The ToF depth camera may include a light emitting diode (LED) to radiate an infrared (IR) light and a sensor to detect the IR light. The ToF depth camera may calculate a distance between the ToF depth camera and an object by measuring a time taken for the IR light from the LED to bounce off the object and return to the sensor.

The IR light may be modulated with a frequency f. That is, the IR light may have a frequency f. ToF $t_{time-of-flight}$ may be calculated indirectly by measuring an intensity of light returning to the sensor based on two or four phases.

SUMMARY

The foregoing and/or other aspects are achieved by providing a method of processing a depth image, the method including receiving a first depth image and a second depth image, determining a number of mods (NoM) of corresponding pixels in the first depth image and the second depth image, and recovering a depth value for at least one of the first depth image and the second depth image based on the determined NoM, the corresponding pixels representing a same three-dimensional (3D) point.

The determining may include determining an NoM of a pixel in the first depth image to minimize an Markov random field (MRF) energy of the first depth image, and determining an NoM of a pixel in the second depth image to minimize an MRF energy of the second depth image.

The MRF energy of the first depth image may be determined based on a data cost for a pixel in the first depth image and a discontinuity cost for two neighboring pixels in the first depth image.

The MRF energy of the second depth image may be determined based on a data cost for a pixel in the second depth image and a discontinuity cost for two neighboring pixels in the second depth image.

The discontinuity cost may be based on a constraint of NoMs in two spatially neighboring pixels in one depth image being the same when 3D distances between the two pixels are similar to one another.

The 3D distance may correspond to a distance between a camera used to generate a depth image including a pixel and a 3D point corresponding to the pixel.

A first pixel in the first depth image and a second pixel in the second depth image may correspond to the corresponding pixels.

The data cost may be calculated by the determined NoM of the first pixel and the determined NoM of the second pixel which minimize a distance between a first 3D point recovered by applying an NoM to the first pixel and a second 3D point recovered by applying an NoM to the second pixel.

A value of the data cost may be changed to a threshold value by a robust potential function when the value of the calculated data cost is greater than the threshold value.

The method may further include updating the recovered depth value of the first depth image using the second depth image having the recovered depth value.

The updating may include updating the recovered depth image of the first depth image by minimizing the MRF energy of the first depth image having the recovered depth value iteratively based on the recovered depth value of the second depth image, such that the recovered depth value of the first depth image is consistent with the recovered depth value of the second depth image.

The method may further include generating the first depth image, and generating the second depth image.

The first depth image and the second depth image may be generated by photographing a scene under at least one condition of different locations and different directions.

The foregoing and/or other aspects are also achieved by providing an apparatus for processing a depth image, the apparatus including a receiving unit configured to receive a first depth image and a second depth image, and a processing unit configured to determine an NoM of corresponding pixels in the first depth image and the second depth image, and to recover a depth value for at least one of the first depth image and the second depth image based on the determined NoM, the corresponding pixels representing a same 3D point.

The processing unit may be configured to determine an NoM for a pixel in the first depth image to minimize an MRF energy of the first depth image, and to determine an NoM for a pixel in the second depth image to minimize an MRF energy of the second depth image.

The processing unit may be configured to determine the MRF energy of the first depth image based on a data cost for a pixel in the first depth image and a discontinuity cost for two neighboring pixels in the first depth image, and to determine the MRF energy of the second depth image based on a data cost for a pixel in the second depth image and a discontinuity cost for two neighboring pixels in the second depth image.

The processing unit may be configured to calculate the data cost by calculating the determined NoM of the first pixel and the determined NoM of the second pixel to minimize a distance between a first 3D point recovered by applying an NoM to the first pixel and a second 3D point recovered by applying an NoM to the second pixel.

The processing unit may be configured to change a value of the data cost to a threshold value by a robust potential function when the value of the calculated data cost is greater than the threshold value.

The processing unit may be configured to update the recovered depth value of the first depth image using the second depth image having the recovered depth value.

The processing unit may be configured to update the recovered depth image of the first depth image by minimizing the MRF energy of the first depth image having the recovered depth value iteratively based on the recovered depth value of the second depth image, such that the recovered depth value of the first depth image is consistent with the recovered depth value of the second depth image.

The apparatus may further include a first camera configured to generate the first depth image by photographing a scene, and a second camera configured to generate the second depth image by photographing the scene.

The first camera and the second camera may be configured to photograph the scene under at least one condition of different locations and different directions.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Reference will now be made in detail to embodiments, examples of which are illustrated in the accompanying drawings, wherein like reference numerals refer to like elements throughout. Embodiments are described below to explain the present disclosure by referring to the figures.

Figure 1:
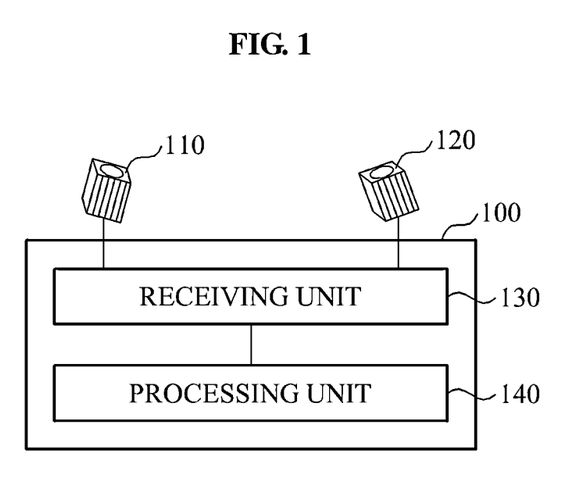
FIG. 1 illustrates an apparatus for processing a depth image according to an example embodiment.

FIG. 1 illustrates an apparatus 100 for processing a depth image according to an example embodiment.

Referring to FIG. 1, the apparatus 100 for processing a depth image includes a first camera 110, a second camera 120, a receiving unit 130, and a processing unit 140.

The first camera 110 may generate a first depth image by photographing a scene. The second camera 120 may generate a second depth image by photographing the scene. The first camera 110 and the second camera 120 may generate the first depth image and the second depth image by photographing the scene at different locations and/or in different directions. The first depth image and the second depth image may be generated by photographing the scene at different locations and in different directions.

Each of the first camera 110 and the second camera 120 may correspond to a Time-of-Flight (ToF) depth camera. The first camera 110 and the second camera 120 may correspond to a stereo ToF depth camera. The disclosure is not limited to two cameras, as there may be more than two cameras. The cameras may be arranged along an axis and capture an image in a same direction, that is the cameras may be separated a predetermined distance and face the same direction. Alternatively, the cameras may be separated a predetermined distance and face a different direction relative to one another, to capture an image. Other arrangements are also possible. For example, the cameras may be arranged along an arc.

The receiving unit 130 may receive the first depth image and the second depth image.

The processing unit 140 may recover a depth value of the first depth image and a depth value of the second depth image. Here, the depth value of the depth image may correspond to a depth value for each pixel of the depth image. The recovery of the depth value may correspond to a change of an incorrect or insufficient depth value to a correct or more correct depth value.

The depth value of a pixel in the depth image may refer to a distance between the camera used in taking the depth image and a three-dimensional (3D) point of the scene corresponding to the pixel. Accordingly, as the distance and the depth value of the pixel are adjacent to each other, the depth value of the pixel may be considered as being more correct.

Figure 2:
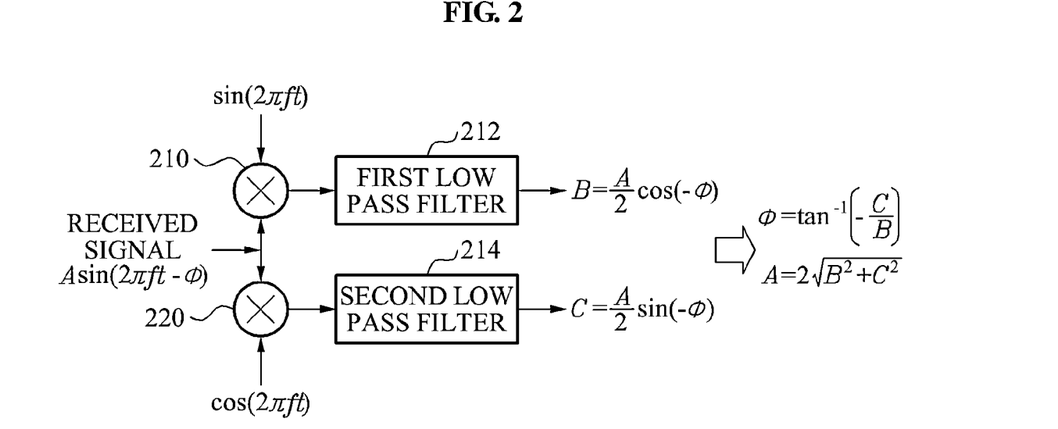
FIG. 2 illustrates a method of calculating a distance using a plurality of Time-of-Flight (ToF) depth cameras according to an example embodiment.

FIG. 2 illustrates a method of calculating a distance using a plurality of ToF depth cameras according to an example embodiment.

The plurality of ToF depth cameras may include the first camera 110 and the second camera 120.

The processing unit 140 may calculate a distance between a ToF depth camera and an object based on the following Equation 1.

$$d = \frac{c \cdot t_{time\text{-}of\text{-}flight}}{2} \quad \text{[Equation 1]}$$

where 'd' may denote a distance between a ToF depth camera and an object. 'c' may denote a velocity of light. $t_{time\text{-}of\text{-}flight}$ may denote a time taken for a light radiated from a light source, for example a light emitting diode (LED) of the ToF depth camera to bounce off the object and return to a sensor. Hereinafter, the light being radiated from the LED may be referred to as a radiated or emitted light, and the light being bounced off the object and returning to the sensor may be referred to as a reflected light. The radiated light may correspond to a light modulated with a frequency f, that is, an infrared (IR) light.

The time-of-flight may be calculated indirectly by measuring an intensity of light returning to the sensor based on two or four phases, for example, by the processing unit 140.

In FIG. 2, the distance may be calculated using an intensity of light measured based on two different phases. Here, two different phases may include a 0 degree phase and a 180 degree phase.

A signal received by the sensor may be represented by Equation 2. Here, the received signal may correspond to the reflected light received by the sensor.

$$A \sin(2\pi f t - \phi) \quad \text{[Equation 2]}$$

where 'A' may denote an amplitude of the received signal. 't' may denote a time. $\phi$ may denote a phase difference between the radiated light and the reflected light.

The processing unit 140 may calculate $t_{time\text{-}of\text{-}flight}$ based on the following Equation 3.

$$t_{time\text{-}of\text{-}flight} = \frac{\phi}{2\pi f} \quad \text{[Equation 3]}$$

The received signal may be mixed with a sine wave sin(2πft) and a cosine wave cos(2πft) by a first mixer 210 and a second mixer 220. Signals generated by mixing may be passed through a first low pass filter 212 and a second low pass filter 214. A first correlation signal 'B' and a second correlation signal 'C' may be generated by passing the signals generated by mixing through the first low pass filter 212 and the second low pass filter 214, respectively. Here, the sine wave sin(2πft) and the cosine wave cos(2πft) may refer to a wave corresponding to a first phase and a wave corresponding to a third phase, respectively.

'B' and 'C' may be calculated based on Equation 4.

$$B = \frac{A}{2}\cos(-\phi)$$
$$C = \frac{A}{2}\sin(-\phi)$$
[Equation 4]

Also, 'A' and φ may be calculated based on Equation 5.

$$\phi = \tan^{-1}\left(-\frac{C}{B}\right)$$
$$A = 2\sqrt{B^2 + C^2}$$
[Equation 5]

$d_{max}$ may denote a maximum distance that can be measured absent ambiguity. For example, $d_{max}$ may denote a distance corresponding to a period of phase difference. $d_{max}$ may be referred to as a non-ambiguous distance range or a maximum acquirable distance.

When the phase difference between the radiated light and the reflected light is greater than 2π, the phase difference may be measured as being smaller than an actual phase difference, that is, in a range between 0 and 2π.

'd' may be calculated based on Equation 6.

$$d = \frac{c\phi}{4\pi f} = d_{max}\frac{\phi}{2\pi}$$
[Equation 6]

To measure 'd' correctly, the processing unit 140 may calculate $d+nd_{max}$ using a sum of the measured phase difference φ and 2πn, φ+2πn. Here, 'n' may denote an integer having a value of 0 or more. A method of measuring depth using a single depth camera may fail to determine a value of 'n'. Accordingly, a maximum distance that can be measured by a depth camera may be $d_{max}$, and the processing unit 140 may fail to calculate a depth value of an object located more distant from a depth camera than $d_{max}$ correctly, producing an incorrect result that is less than an actual distance value. Here, the depth value of the object may correspond to a depth value of a pixel representing the object among pixels of a depth image.

That is, the depth value of the depth image taken with the first camera 110 or the second camera 120 in the presence of ambiguity may correspond to a wrong depth value from which $nd_{max}$ is missing. The processing unit 140 may recover the depth value of the depth image by adding $nd_{max}$ to the depth value of the depth image.

The depth value recovered by referring to FIG. 1 may correspond to a wide-range recovered depth value by determining the value of 'n'. Also, the recovered depth image may be a depth image which has a wide-range recovered depth value by determining the value of 'n' for each depth value of pixels in the depth image.

Here, 'n' may represent a number of mods (NoM). A measured distance 'd' between a camera and an object located at a distance greater than $d_{max}$ may be shorter than an actual distance $d+nd_{max}$ between the camera and the object. This phenomenon may refer to phase wrapping. Also, phase unwrapping may refer to a process of estimating an unknown number 'n' of wrapping. When a maximum distance $d_{max}$ that can be measured absent ambiguity is given, NoM may correspond to a number of phase wrappings in the actual distance '$d+nd_{max}$' between the camera and the object. For example, NoM may correspond to a result of dividing an actual distance value between the camera and the object by a measured distance value between the camera and the object. NoM may correspond to a number of phase wrappings which occur in the measured distance 'd' between the camera and the object, where $d_{max}$ is the maximum distance that can be measured from the camera absent ambiguity and $d+nd_{max}$ is the actual distance between the camera and the object.

The technical disclosure provided with reference to Equations 1 through 6 may be applied to each signal received by a plurality of cameras.

Figure 3:
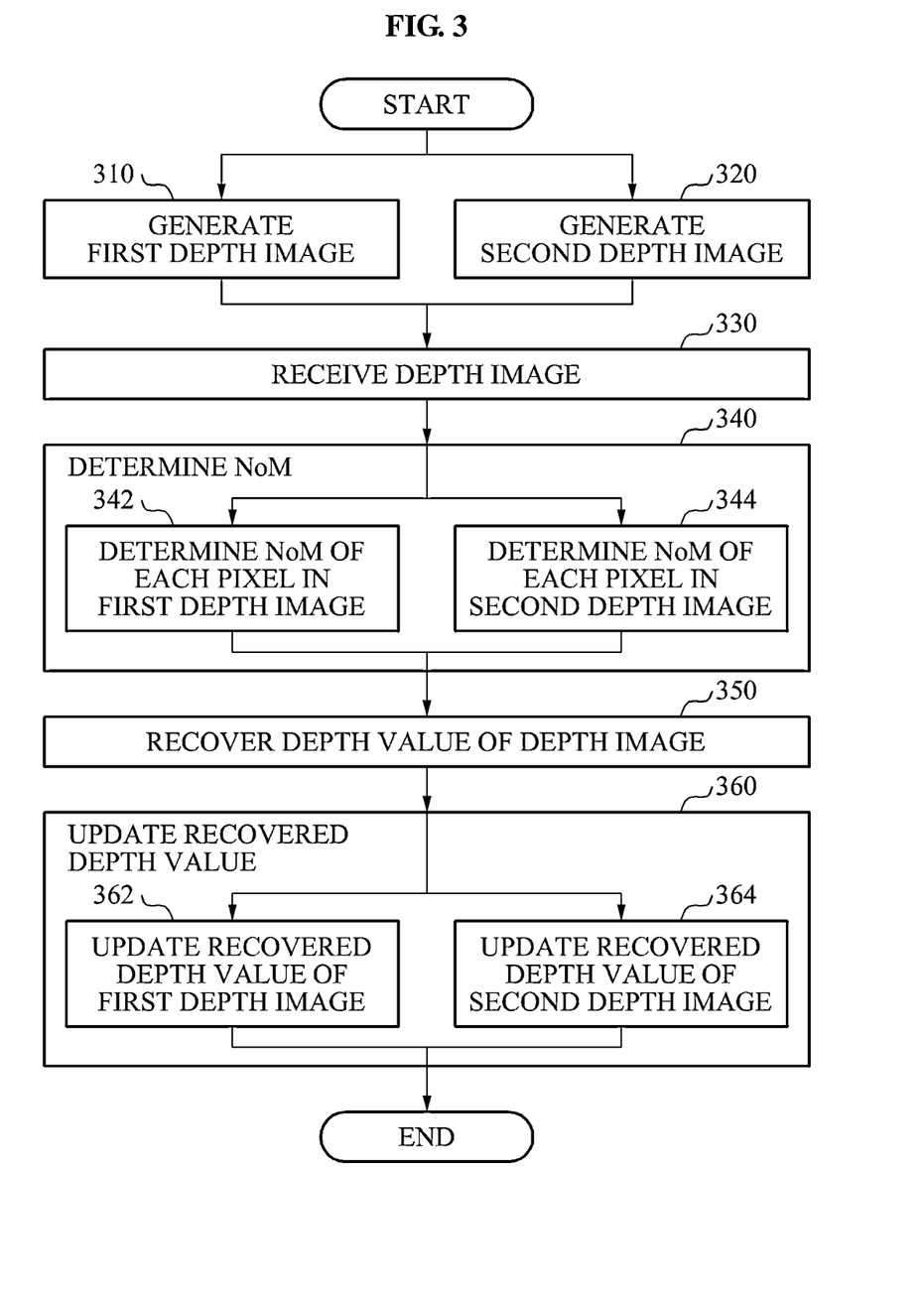
FIG. 3 illustrates a method of recovering a depth value of a depth image according to an example embodiment.

FIG. 3 illustrates a method of recovering a depth value of a depth image according to an example embodiment.

Referring to FIG. 3, in operation 310, the first camera 110 may generate a first depth image by photographing a scene.

In operation 320, the second camera 120 may generate a second depth image by photographing the scene.

In operations 310 and 320, the first camera 110 and the second camera 120 may photograph the same scene at different locations and/or in different directions. That is, the first depth image and the second depth image may be generated by photographing the scene at different locations and/or in different directions. The first depth image and the second depth image may have different viewpoints for the scene.

In operation 330, the receiving unit 130 may receive the first depth image from the first camera 110 and the second depth image from the second camera 120.

In operation 340, the processing unit 140 may determine a NoM for each of corresponding pixels in the first depth image and the second depth image. Here, the corresponding pixels may represent the same 3D point. That is, when an object in the scene is photographed by the first camera 110 and the second camera 120, a pixel representing the object in the first depth image and a pixel representing the object in the second depth image may refer to corresponding pixels.

The determining of the NoM is described in detail with reference to FIG. 4.

The operation 340 may include operation 342 and operation 344.

In operation 342, the processing unit 140 may determine an NoM for each pixel in the first depth image to minimize a Markov random field (MRF) energy of the first depth image. The MRF energy is described in detail with reference to FIG. 5.

In operation 344, the processing unit 140 may determine an NoM for each pixel in the second depth image to minimize an MRF energy of the second depth image.

In operation 350, the processing unit 140 may recover a depth value of at least one of the first depth image and the second depth image based on the determined NoM.

In operation 360, the processing unit 140 may update the recovered depth value of the first depth image and the recovered depth value of the second depth image using the first depth image having the recovered depth value and the second depth image having the recovered depth value. Operation 360 may correspond to an operation of optimizing the first depth image and the second depth image.

The operation 360 may include operation 362 and operation 364.

In operation 362, the processing unit 140 may update the recovered depth value of the first depth image using the second depth image having the recovered depth value.

In operation 364, the processing unit 140 may update the recovered depth value of the second depth image using the first depth image having the recovered depth value.

Figure 4:
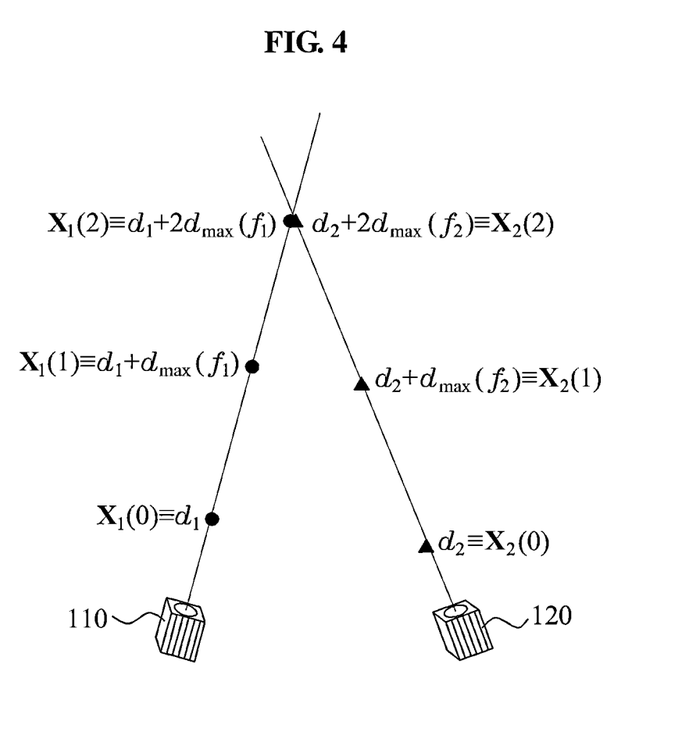
FIG. 4 illustrates a distance change of a three-dimensional (3D) point depending on a number of mods (NoM) according to an example embodiment.

FIG. 4 illustrates a distance change of a 3D point depending on an NoM according to an example embodiment.

A first pixel may correspond to one pixel among pixels of the first depth image. A second pixel may correspond to one pixel among pixels of the second depth image. The first pixel and the second pixel may refer to corresponding pixels.

In operation 330 of FIG. 3, the first pixel of the first depth image may have a depth value '$d_1$'. The second pixel of the second depth image may have a depth value '$d_2$'. As described with reference to FIG. 2, '$d_1$' may range from '0' to a value smaller than $d_{max}(f_1)$, and '$d_2$' may range from '0' to a value smaller than $d_{max}(f_2)$.

$d_{max}(f_1)$ may correspond to $d_{max}$ of the signal sensed by the sensor of the first camera 110 when the light radiated from the first camera 110 is modulated with a frequency $f_1$. Here, $d_{max}$ of the signal may correspond to $d_{max}$ of the pixel in the depth image. Also, $d_{max}(f_2)$ may correspond to $d_{max}$ of the signal sensed by the sensor of the second camera 120 when the light radiated from the second camera 120 is modulated with a frequency $f_2$. Here, $d_{max}$ of the signal may correspond to $d_{max}$ of the pixel in the depth image. That is, each pixel of the first depth image may have a depth value in a range of '0' to $d_{max}(f_1)$ irrespective of a distance at which a point represented by each pixel is actually located from the first camera 110. The depth value of the pixel in the first depth image may correspond to a remainder when dividing an actual distance value between the point represented by the pixel and the first camera 110 by $d_{max}(f_1)$.

'$x_1$' may denote the first pixel. Also, '$x_2$' may denote the second pixel. $X_1$ may represent a 3D point corresponding to '$x_1$'. $X_2$ may represent a 3D point corresponding to '$x_2$'.

When the depth value of '$x_1$' generated by the first camera 110 is '$d_1$', a distance between the first camera 110 and $X_1$ may correspond to $d_1 + n_1 d_{max}(f_1)$. '$n_1$' may denote '$x_1$' and an NoM of $X_1$. '$n_1$' may correspond to an integer having a value of 0 or more. Also, when the depth value of '$x_2$' generated by the second camera 120 is '$d_2$', a distance between the second camera 120 and $X_2$ may correspond to $d_2 + n_2 d_{max}(f_2)$. '$n_2$' may denote '$x_2$' and an NoM of $X_2$. '$n_2$' may correspond to an integer having a value of '0' or more.

$X_1(k_1)$ may represent a 3D point corresponding to '$x_1$' when a value of '$n_1$' is '$k_1$'. That is, $X_1(k_1)$ may represent a 3D point corresponding to '$x_1$' determined based on a location and a direction of the first camera 110, '$d_1$', and $d_{max}(f_1)$, when an NoM of '$x_1$' is '$k_1$'. $X_2(k_2)$ may represent a 3D point corresponding to '$x_2$' when a value of '$n_2$' is '$k_2$'. That is, $X_2(k_2)$ may represent a 3D point corresponding to '$x_2$' determined based on a location and a direction of the second camera 120, '$d_2$', and $d_{max}(f_2)$, when an NoM of '$x_2$' is '$k_2$'.

A symbol '≡' may be used to represent a distance between the camera and the 3D point. An expression '$X_1(k_1) \equiv d_1$' may indicate that a distance between the first camera 110 and $X_1(k_1)$ is '$d_1$'. An expression '$d_2 \equiv X_2(k_2)$' may indicate that a distance between the second camera 120 and $X_2(k_2)$ is '$d_2$'.

In FIG. 4, a location of each of $X_1(0)$, $X_1(1)$, and $X_1(2)$ is shown. Also, a location of each of $X_2(0)$, $X_2(1)$, and $X_2(2)$ is shown.

The processing unit 140 may recover the 3D point $X_1$ corresponding to '$x_1$' based on '$x_1$'. Here, recovery may correspond to a determination of the NoM of '$x_1$'. That is, recovery may comprise determining one among $X_1(0)$ through $X_1(m_1)$ to be the 3D point corresponding to '$x_1$'. Here, '$m_1$' may denote a maximum value of '$k_1$'.

When '$x_1$' corresponds to '$x_2$', the 3D point recovered from '$x_1$' and the 3D point recovered from '$x_2$' may correspond to points placed at the same location or points placed within a predetermined distance.

In FIG. 4, a trace of $X_1$ corresponding to '$x_1$' with changes of a value of '$n_1$' and a trace of $X_2$ corresponding to '$x_2$' with changes of a value of '$n_2$' are shown as straight lines. When the NoM of $X_1$ and the NoM of $X_2$ are each 2, $X_1$ and $X_2$ may intersect at one point. Accordingly, it may be determined that $X_1$ and $X_2$ are recovered correctly when '$n_1$' and '$n_2$' are each 2. That is, the 3D point recovered from '$x_1$' may correspond to $X_1(2)$, and the 3D point recovered from '$x_2$' may correspond to $X_2(2)$.

The processing unit 140 may calculate optimum NoMs of $X_1$ and $X_2$ based on Equation 7.

$$m^* = \arg\min_m(\min_n(\|RX_1(m) + T - X_2(n)\|))$$

$$n^* = \arg\min_n(\min_m(\|R^T(X_2(n) - T) - X_1(m)\|))$$ [Equation 7]

where 'R' may denote a rotation matrix representing rotation between the first camera 110 and the second camera 120. 'R' may denote a rotation matrix representing rotation in a direction from the first camera 110 to the second camera 120. 'R' may correspond to a 3×3 rotation matrix. $R^T$ may denote the transpose of the matrix 'R'.

'T' may denote a 3D translation vector indicating translation between the first camera 110 and the second camera 120. 'T' may denote a 3D translation vector indicating translation from a location of the first camera 110 to a location of the second camera 120.

Each of 'R' and 'T' may denote a predetermined value given by extrinsic calibration of the first camera 110 and the second camera 120.

In Equation 7, 'm' may denote the NoM of the 3D point $X_1$ corresponding to the pixel '$x_1$' in the first depth image taken with the first camera 110. 'n' may denote the NoM of the 3D point $X_2$ corresponding to the pixel '$x_2$' in the second depth image taken with the second camera 120.

$X_2(n)$ may represent a 3D point when $X_1(m)$ is projected on the second depth image and an NoM of a pixel projected on the second depth image is 'n'. Here, the pixel having $X_1(m)$ projected on the second depth image may correspond to $X_2$. $X_1(m)$ may represent a 3D point when $X_2(n)$ is projected on the first depth image and an NoM of a pixel projected on the first depth image is 'm'. Here, the pixel having $X_2(n)$ projected on the second depth image may correspond to $X_1$.

Each of $m^*$ and $n^*$ may denote an optimum NoM for minimizing a distance between the 3D point generated by recovering $X_1$ and the 3D point generated by recovering $X_2$.

The functions of Equation 7 may be referred to as cost functions.

Figure 5:
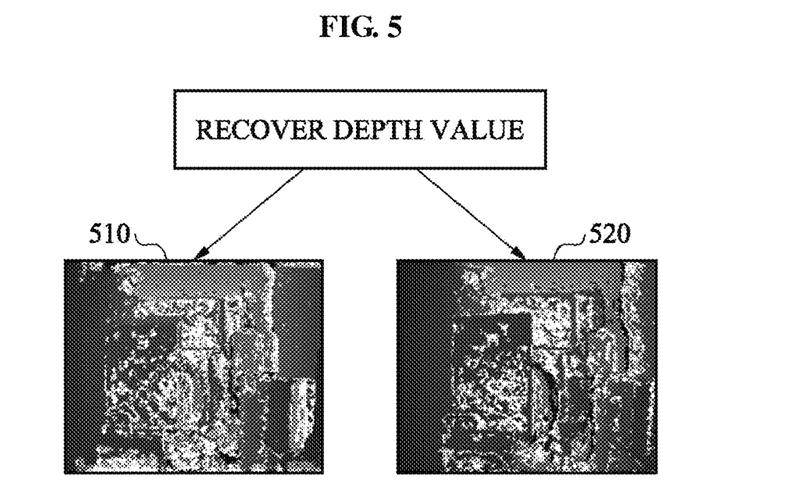
FIG. 5 illustrates examples of images recovered using a data cost function according to an example embodiment.

FIG. 5 illustrates examples of images recovered using a data cost function according to an example embodiment.

Referring to FIG. 3, the processing unit 140 may generate a first recovered depth image 510 and a second recovered depth image 520 by applying a data cost function to the first depth image and the second depth image, respectively, in operation 340.

When the first camera 110 and the second camera 120 have the same viewpoint, occlusion may be absent in the first depth image taken with the first camera 110 and the second depth image taken with the second camera 120. Accordingly, a corresponding pixel may be present in another depth image for each pixel of one depth image.

However, since the first camera 110 and the second camera 120 have different locations and/or different directions for the scene, corresponding pixels for some pixels of one depth image may be absent in another depth image. That is, occlusion may be present in the first depth image and the second depth image. Also, noise in the first depth image and the second depth image may result in incorrect calculation of an NoM using a data cost function.

FIG. 5 shows the first recovered depth image 510 and the second recovered depth image 520 as examples of incorrect recovered depth images caused by occlusion and noise.

MRF energies of the first depth image and the second depth image may be defined as shown in the following Equation 8. The processing unit 140 may use the MRF energy function defined based on Equation 8, to determine the NoM for each pixel of the first depth image and the NoM for each pixel of the second depth image.

$$E_1 = \sum_i D_1(m_i) + \lambda \sum_{(i,j)\in N} V_1(m_i, m_j)$$
$$E_2 = \sum_i D_2(n_i) + \lambda \sum_{(i,j)\in N} V_2(n_i, n_j)$$

[Equation 8]

where $E_1$ may denote an MRF energy of the first depth image. $E_2$ may denote an MRF energy of the second depth image.

Each of 'i' and 'i' may denote an index of a pixel in the first depth image or the second depth image.

'N' may denote a set of neighboring pixel pairs in the first depth image or the second depth image. That is, (i, j) may denote an index pair of two neighboring pixels in the first depth image or the second depth image. A pixel having an index 'i' may have four or eight neighboring pixels.

'$m_i$' may denote an NoM of a pixel having an index 'I' in the first depth image. '$m_j$' may denote an NoM of a pixel having an index 'J' in the first depth image. '$n_i$' may denote an NoM of a pixel having an index 'I' in the second depth image. '$n_j$' may denote an NoM of a pixel having an index 'J' in the second depth image.

'$D_1$' may denote a data cost for the first depth image. '$D_2$' may denote a data cost for the second depth image. '$D_1(m_i)$' may denote a data cost for the NoM of the pixel having the index 'I' in the first depth image. '$D_2(n_i)$' may denote a data cost for the NoM of the pixel having the index 'I' in the second depth image.

'$V_1$' may denote a discontinuity cost for the first depth image. '$V_2$' may denote a discontinuity cost for the second depth image. '$V_1(m_i, m_j)$' may denote a discontinuity cost between the NoM of the pixel having the index 'I' in the first depth image and the NoM of the pixel having the index 'J' in the first depth image. '$V_2(n_i, n_j)$' may denote a discontinuity cost between the NoM of the pixel having the index 'I' in the second depth image and the NoM of the pixel having the index 'J' in the second depth image.

The discontinuity cost may be based on a constraint of NoMs in two spatially neighboring pixels in one depth image being the same when 3D distances between the two pixels are similar to one another. Here, the 3D distance may correspond to a distance between a camera used to generate a depth image including a pixel and a 3D point corresponding to the pixel.

'$\lambda$' may denote a balancing coefficient. The balancing coefficient may be a value used to coordinate a difference of units of the discontinuity cost and the data cost consistent or to coordinate a difference units of the discontinuity cost and the MRF energy consistent. '$\lambda$' may have a constant value.

That is, the processing unit 140 may determine the MRF energy of the first depth image based on the data cost for each pixel in the first depth image and the discontinuity cost for neighboring pixels in the first depth image, and may determine the MRF energy of the second depth image based on the data cost for each pixel in the second depth image and the discontinuity cost for neighboring pixels in the second depth image.

The processing unit 140 may determine the NoM for each pixel of the first depth image to minimize the MRF energy of the first depth image, and may determine the NoM for each pixel of the second depth image to minimize the MRF energy of the second depth image.

Each of $D_1(m_i)$ and $D_2(n_i)$ may be defined by Equation 9. The processing unit 140 may use a function defined by Equation 9 to calculate a data cost for each of '$M_i$' and '$N_i$'.

$$D_1(m_i) = \delta(\min_{n_k}(\|RX_{1i}(m_i) + T - X_{2k}(n_k)\|))$$
$$D_2(n_i) = \delta(\min_{m_k}(\|R^T(X_{2i}(n_i) - T) - X_{1k}(m_k)\|))$$

[Equation 9]

'$x_{1i}$' may denote a pixel having an index 'I' in the first depth image. '$x_{2i}$' may denote a pixel having an index 'I' in the second depth image. '$x_{1k}$' may denote a pixel having an index 'k' in the first depth image. '$x_{2k}$' may denote a pixel having an index 'k' in the second depth image. Each of '$x_{1i}$' and '$x_{2k}$' may correspond to the first pixel and the second pixel described with reference to FIG. 4, respectively. That is, '$x_{1i}$' and '$x_{2k}$' may refer to corresponding pixels. Also, each of '$x_{1k}$' and '$x_{2i}$' may correspond to the first pixel and the second pixel described with reference to FIG. 4, respectively. That is, '$x_{1k}$' and '$x_{2i}$' may refer to corresponding pixels.

'$X_{1i}(m_i)$' may represent a 3D point corresponding to '$x_{1i}$', calculated based on '$m_i$' when an NoM of '$x_{1i}$' is '$m_i$'. '$X_{1k}(m_k)$' may represent a 3D point corresponding to '$x_{1k}$', calculated based on '$m_k$' when an NoM of '$x_{1k}$' is '$m_k$'. '$X_{2i}(n_i)$' may represent a 3D point corresponding to '$x_{2i}$', calculated based on '$n_i$' when an NoM of '$x_{2i}$' is '$n_i$'. '$X_{2k}(n_k)$' may represent a 3D point corresponding to '$x_{2k}$', calculated based on '$n_k$' when an NoM of '$x_{2k}$' is '$n_k$'.

'$\delta$' may denote a function for limiting an eventual distance error. '≡' may denote a robust potential function. In Equation 9, data costs $D_1$ and $D_2$ may be such that the robust potential function '$\delta$' is applied. When a distance between two 3D points is calculated as being greater than a predetermined threshold value due to occlusion or noise, '$\delta$' may be used to replace the result with the threshold value.

In Equation 9, when the calculated data cost is greater than the threshold value, a value of the data cost may be changed to the threshold value by the robust potential function. When the value of the calculated data cost is greater than the threshold value, the processing unit 140 may change the value of data cost to the threshold value using the robust potential function.

As shown in Equation 9, the processing unit 140 may calculate the data cost by calculating the determined NoM of the first pixel and the determined NoM of the second pixel which minimize a distance between a first 3D point recovered by applying an NoM to the first pixel and a second 3D point recovered by applying an NoM to the second pixel.

Each of $V_1(m_i, m_j)$ and $V_2(n_i, n_j)$ may be defined by Equation 10. The processing unit 140 may use a function defined by Equation 10 to calculate a discontinuity cost for each of index pairs $(m_i, m_j)$ and $(n_i, n_j)$.

$$V_1(m_i, m_j) = \begin{cases} v(\|X_{1i} - X_{1j}\|) & \text{if } m_i \neq m_j, \|X_{1i} - X_{1j}\| < \tau \\ 0 & \text{otherwise} \end{cases}$$

$$V_2(n_i, n_j) = \begin{cases} v(\|X_{2i} - X_{2j}\|) & \text{if } n_i \neq n_j, \|X_{2i} - X_{2j}\| < \tau \\ 0 & \text{otherwise} \end{cases}$$

[Equation 10]

where '$\tau$' may denote a critical value. For example, when a distance between two 3D points $X_{1i}$ and $X_{1j}$ is greater than or equal to the critical value '$\tau$', a value of the discontinuity cost $V_1(m_i, m_j)$ may be '0'. '$\tau$' may have a constant value.

'v' may denote a function or constant for determining $V_1(m_i, m_j)$ based on the distance between '$X_{1i}$' and '$X_{1j}$'. 'v' may denote a function or constant for determining $V_2(m_i, m_j)$ based on the distance between '$X_{2i}$' and '$X_{2j}$'. 'v' may correspond to a function for generating an output value inversely proportional to an input value, that is, the distance between '$X_{1i}$' and '$X_{1j}$' or the distance between '$X_{2i}$' and '$X_{2j}$'. That is, 'v' may correspond to a function for making $V_1(m_i, m_j)$ or $V_2(n_i, n_j)$ have have a great value, when the distance between '$X_{1i}$' and '$X_{1j}$' or the distance between '$X_{2i}$' and '$X_{2j}$' is short and a value of '$m_i$' is different from a value of '$m_j$'.

Figure 6:
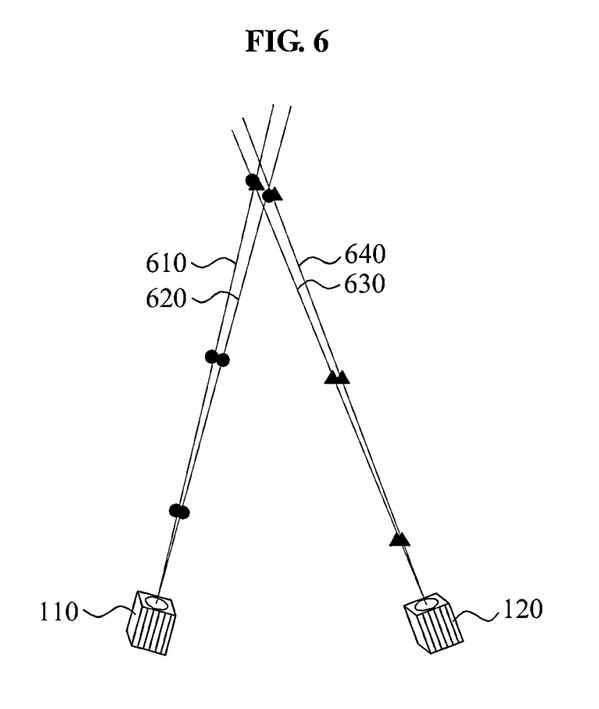
FIG. 6 illustrates a role of a discontinuity cost according to an example embodiment.

FIG. 6 illustrates a role of a discontinuity cost according to an example embodiment.

The discontinuity cost 'V' may be based on a constraint of NoMs in two spatially neighboring pixels in one depth image being the same when 3D distances between the two pixels are similar to one another.

A pixel '$x_{1a}$' and a pixel '$x_{1b}$' may correspond to neighboring pixels in the first depth image. A pixel '$x_{2a}$' and a pixel '$x_{2b}$' may correspond to neighboring pixels in the second depth image.

'$x_{1a}$' may correspond to '$x_{2a}$'. Also, '$x_{1b}$' may correspond to '$x_{2b}$'.

In FIG. 6, a trace 610 of a 3D point '$X_{1a}$' corresponding to '$x_{1a}$', a trace 620 of a 3D point '$X_{1b}$' corresponding to '$x_{1b}$', a trace 630 of a 3D point '$X_{2a}$' corresponding to '$x_{2a}$', and a trace 640 of a 3D point '$X_{2b}$' corresponding to '$x_{2b}$', are shown.

'$X_{1a}$', '$X_{1b}$', '$X_{2a}$', and '$X_{2b}$' are each represented by a circle or a triangle when the NoM is 0, 1, and 2, in a direction from a point close to the first camera 110 or the second camera 120 to a point distant from the first camera 110 or the second camera 120.

According to FIG. 6, values of the NoMs of '$X_{1a}$', '$X_{1b}$', '$X_{2a}$', and '$X_{2b}$' are all '2'. Accordingly, recovered depth images of neighboring pixels in one depth image may have consistency.

The recovery of the depth value of the depth image using the MRF energy, described with reference to FIG. 6, may be performed separately for each depth image. Referring to FIG. 3, the first depth image having the recovered depth value may be inconsistent with the second depth image having the recovered depth value in operation 360.

To resolve the inconsistency, in operation 360, the processing unit 140 may update the recovered depth value of the other depth image using the recovered depth value of the other depth image among the two depth images having the recovered depth values. That is, the processing unit 140 may update each of the depth values of the first depth image and the second depth image having the recovered depth values recovered in operation 350, using the other depth image having the recovered depth value.

The processing unit 140 may obtain consistent depth images by updating the first depth image having the recovered depth value and the second depth image having the recovered depth value.

When the first depth image and the second depth image are recovered, the processing unit 140 may update the recovered depth value of the first depth image based on Equation 11 to make the first depth image consistent with the second depth image.

$$F_1(m_i) = \delta(\|RX_{1i}(m_i) + T - X_{2k}(n_k^*)\|)$$

[Equation 11]

where '$F_1(m_i)$' may denote a data cost for updating the depth value of the first depth image.

'$m_i$' may denote an NoM of a pixel '$x_{1i}$' having an index 'I' in the first depth image. '$n_k^*$' may denote an NoM of a pixel '$x_{2k}$' having an index 'k' in the second depth image having the recovered depth value. '$n_k^*$' may denote an NoM of a pixel having an index 'k' in the second depth image, determined in operation 340. The pixel '$x_{1i}$' and the pixel '$x_{2k}$' may refer to corresponding pixels representing the same 3D point.

'$X_{2k}(n_k^*)$' may denote a wide-range recovered 3D point corresponding to '$X_{1i}(m_i)$'.

The processing unit 140 may update the depth value of the pixel having the index 'I' in the first depth image by determining the NoM '$m_i$' of the pixel to minimize '$F_1(m_i)$'. '$F_1(m_i)$' may denote a data cost for the pixel of the first depth image calculated based on the recovered depth value of the second depth image.

When the recovered depth value of the second depth image is correct, '$F_1(m_i)$' of Equation 11 may replace '$D_1(m_i)$'. However, it may fail to guarantee that the recovered depth value of the second depth image is correct. In operation 362, the processing unit 140 may minimize the MRF energy of the first depth image having the recovered depth value iteratively based on the recovered depth value of the second depth image, to make the recovered depth value of the first depth image consistent with the recovered depth value of the second depth image. The processing unit 140 may update the recovered depth value of the first depth image by minimizing the MRF energy iteratively.

The processing unit 140 may minimize the MRF energy iteratively based on Equation 12.

$$D_1^t(m_i) = \left(\frac{T-t}{T}\right) D_1(m_i) + \frac{t}{T} F_1(m_i)$$

[Equation 12]

where 'T' may denote a maximum number of iterations. 'T' may correspond to an integer having a value of '0' or more. 't' may denote a current number of iterations. 't' may correspond to an integer having a value in a range of '0' to 'T'. Equation 11 may represent blending of '$D_1(m_i)$' and '$F_1(m_i)$'.

'$D_1^t(m_i)$' may denote a data cost for an NoM '$m_i$' of a pixel '$x_{1i}$' having an index 'I' in the first depth image during a 't'th iteration. The processing unit 140 may update the depth value of '$x_{1i}$' by determining the NoM '$m_i$' of '$x_{1i}$' to minimize '$D_1^t(m_i)$'.

When a value of 't' is '0', the processing unit 140 may use '$D_1(m_i)$' described with reference to Equation 9 to recover the depth value of the first depth image. When a value of 't' is '1' or more, the processing unit 140 may use '$F_1(m_i)$' described with reference to Equation 11 along with '$D_1(m_i)$', to recover the depth value of the first depth image.

The updating of the depth value may be applied to the second depth image having the recovered depth value.

The processing unit 140 may update the recovered depth value of the second depth image based on Equation 13 to make the second depth image consistent with the first depth image.

$$F_2(n_i) = \delta(\|R^T(X_{2i}(n_i)-T) - X_{1k}(m_k^*)\|\mu)$$

where '$F_2(n_i)$' denote a data cost for updating the depth value of the second depth image.

'$n_i$' may denote an NoM '$m_i$' of a pixel '$x_{2i}$' having an index 'I' in the second depth image. '$m_k^*$' may denote an NoM of a pixel '$x_{1k}$' having an index 'k' in the first depth image having the recovered depth value. '$m_k^*$' may denote an NoM of a pixel having an index 'k' in the first depth image, determined in operation 340. The pixel '$x_{2i}$' and the pixel '$x_{1k}$' may refer to corresponding pixels representing the same 3D point.

'$X_{1k}(m_k^*)$' may denote a wide-range recovered 3D point corresponding to '$X_{2i}(n_i)$'.

The processing unit 140 may update a depth value of a pixel having an index 't' in the second depth image by determining an NoM '$n_i$' of the pixel to minimize '$F_2(n_i)$'. '$F_2(n_i)$' may denote a data cost for the pixel of the second depth image calculated based on the recovered depth value of the first depth image.

In operation 364, the processing unit 140 may minimize the MRF energy of the second depth image having the recovered depth value iteratively based on the recovered depth value of the first depth image, to make the recovered depth value of the second depth image consistent with the recovered depth value of the first depth image.

The processing unit 140 may minimize the MRF energy iteratively based on Equation 14.

$$D_2^t(n_i) = \left(\frac{T-t}{T}\right)D_2(n_i) + \frac{t}{T}F_2(n_i) \quad \text{[Equation 14]}$$

'$D_2^t(n_i)$' denote a data cost for an NoM '$n_i$' of a pixel '$x_{2i}$' having an index 'I' in the second depth image during the 't'th iteration. The processing unit 140 may update the depth value of '$x_{2i}$' by determining the NoM '$m_i$' of '$x_{2i}$' to minimize '$D_2^t(n_i)$'.

When a value of 't' is '0', the processing unit 140 may use '$D_2(n_i)$' described with reference to Equation 9 to recover the depth value of the second depth image. When a value of 't' is '1' or more, the processing unit 140 may use '$F_2(n_i)$' described with reference to Equation 13 along with '$D_2(n_i)$', to recover the depth value of the second depth image.

In operation 360, the processing unit 140 may update the recovered depth value of the first depth image and the recovered depth value of the second depth image by minimizing the MRF energy iteratively based on Equation 15, to make the first depth image and the second depth image consistent with one another.

$$E_1^t = \sum_i D_1^t(m_i) + \lambda \sum_{(i,j) \in N} V_1(m_i, m_j) \quad \text{[Equation 15]}$$

$$E_2^t = \sum_i D_2^t(n_i) + \lambda \sum_{(i,j) \in N} V_2(n_i, n_j)$$

where '$E_1^t$' and '$E_2^t$' may denote the MRF energy of the first depth image and the MRF energy of the second depth image during the 't'th iteration, respectively.

Figure 7:
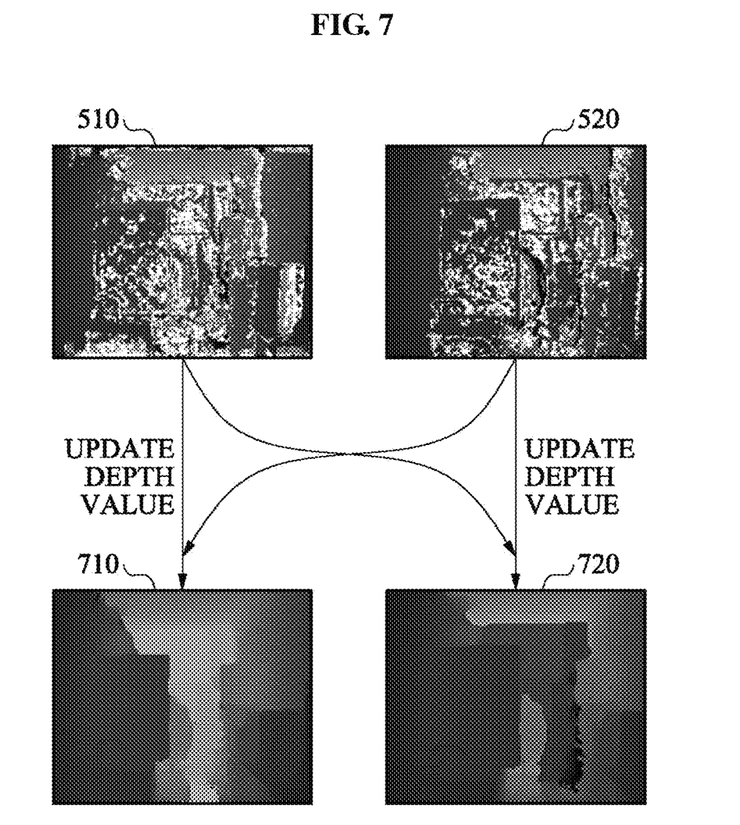
FIG. 7 illustrates examples of depth images having updated depth values according to an example embodiment.

FIG. 7 illustrates examples of depth images having updated depth values according to an example embodiment.

A first updated depth image 710 may correspond to a depth image generated by updating the depth value of the first recovered depth image 510 using the depth value of the second recovered depth image 520 described with reference to FIG. 5.

A second updated depth image 720 may correspond to a depth image generated by updating the depth value of the second recovered depth image 520 using the depth value of the first recovered depth image 510 described with reference to FIG. 5.

By performing an update as described with reference to FIG. 7, the first updated depth image 710 and the second updated depth image 720 may have improved consistency, when compared to the consistency between the first recovered depth image 510 and the second recovered depth image 520.

The exemplary embodiments may recover depth values of depth images taken with a plurality of cameras at the same time, by using the depth images. Also, the exemplary embodiments may recover the depth values of the depth images in a case in which a moving object is present independently of a motion of the plurality of cameras. In this instance, the recovered depth values may be a depth value of wide-range depth which is equal to or greater than the maximum acquirable distance.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors. The one or more processors may include a microprocessor, central processing unit (CPU), digital signal processor (DSP), or application-specific integrated circuit (ASIC), as well as portions or combinations of these and other processing devices.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The methods according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard discs, floppy discs, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Each block of the flowchart illustrations may represent a unit, module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

Although example embodiments of the present invention have been shown and described, it would be appreciated by those skilled in the art that changes may be made to these embodiments without departing from the principles and spirit of the disclosure, the scope of which is defined by the claims and their equivalents.

What is claimed is:

1. A method of processing a depth image, the method comprising:
    receiving a first depth image and a second depth image, the first depth image indicating an estimated first distance between a first depth camera and an object, and the second depth image indicating an estimated second distance between a second depth camera and the object;
    determining a number of mods (NoM) of corresponding pixels in the first depth image and the second depth image such that the determined NoM represents a number of periodic phase wrappings in the estimated first distance and the estimated second distance; and
    recovering a depth value for at least one of the estimated first distance and the estimated second distance based on the determined NoM,
    wherein the corresponding pixels represent a same three-dimensional (3D) point.

2. The method of claim 1, wherein the determining comprises:
    determining a NoM of a pixel in the first depth image to minimize a Markov random field (MRF) energy of the first depth image; and
    determining a NoM of a pixel in the second depth image to minimize a MRF energy of the second depth image.

3. The method of claim 2, wherein the MRF energy of the first depth image is determined based on a data cost for a pixel in the first depth image and a discontinuity cost for at least two neighboring pixels in the first depth image, and
    the MRF energy of the second depth image is determined based on a data cost for a pixel in the second depth image and a discontinuity cost for at least two neighboring pixels in the second depth image, and
    the 3D distance corresponding to a distance between a camera used to generate a depth image including a pixel and a 3D point corresponding to the pixel.

4. The method of claim 3, wherein a first pixel in the first depth image and a second pixel in the second depth image are corresponding pixels, and
    the data cost is calculated by the determined NoM of the first pixel and the determined NoM of the second pixel which minimize a distance between a first 3D point recovered by applying an NoM to the first pixel and a second 3D point recovered by applying an NoM to the second pixel.

5. The method of claim 4, wherein a value of the data cost is changed to a threshold value by a robust potential function when the value of the calculated data cost is greater than the threshold value.

6. The method of claim 3, wherein the discontinuity cost is based on a constraint of NoMs in two spatially neighboring pixels in one depth image being the same when 3D distances between the two pixels are similar to one another.

7. The method of claim 1, further comprising:
    updating the recovered depth value of the first depth image using the second depth image having the recovered depth value such that the recovered depth value of the first depth image is consistent with the recovered depth value of the second depth image.

8. The method of claim 7, wherein the updating comprises:
    updating the recovered depth image of the first depth image by minimizing a Markov random field (MRF) energy of the first depth image having the recovered depth value iteratively based on the recovered depth value of the second depth image.

9. The method of claim 1, further comprising:
    generating the first depth image; and
    generating the second depth image,
    the first depth image and the second depth image being generated by photographing a scene using at least the first depth camera and the second depth camera, respectively, the first depth camera and the second depth camera being arranged at at least one of different locations and different directions.

10. A non-transitory computer-readable recording medium comprising a program for implementing the method of claim 1.

11. An apparatus for processing a depth image, the apparatus comprising:
    a receiver configured to receive a first depth image and a second depth image, the first depth image indicating an estimated first distance between a first depth camera and an object, and the second depth image indicating an estimated second distance between a second depth camera and the object; and
    a processor configured to,
        determine a number of mods (NoM) of corresponding pixels in the first depth image and the second depth image such that the determined NoM represents a number of periodic phase wrappings in the estimated first distance and the estimated second distance, and
        recover a depth value for at least one of estimated first distance and the estimated second distance based on the determined NoM,
    wherein the corresponding pixels represent a same three-dimensional (3D) point.

12. The apparatus of claim 11, wherein the processor is configured to determine a NoM of a pixel in the first depth image to minimize a Markov random field (MRF) energy of the first depth image, and to determine a NoM of a pixel in the second depth image to minimize a MRF energy of the second depth image.

13. The apparatus of claim 12, wherein the processor is configured to determine the MRF energy of the first depth image based on a data cost for a pixel in the first depth image and a discontinuity cost for at least two neighboring pixels in the first depth image, and to determine the MRF energy of the second depth image based on a data cost for a pixel in the second depth image and a discontinuity cost for at least two neighboring pixels in the second depth image, and the 3D distance corresponds to a distance between a camera used to generate a depth image including a pixel and a 3D point corresponding to the pixel.

14. The apparatus of claim 13, wherein the processor is configured to calculate the data cost by calculating the determined NoM of the first pixel and the determined NoM of the second pixel which minimize a distance between a first 3D point recovered by applying an NoM to the first pixel and a second 3D point recovered by applying an NoM to the second pixel.

15. The apparatus of claim 14, wherein the processor is configured to change a value of the data cost to a threshold value by a robust potential function when the value of the calculated data cost is greater than the threshold value.

16. The apparatus of claim 13, wherein the discontinuity cost is based on a constraint of NoMs in two spatially neighboring pixels in one depth image being the same when 3D distances between the two pixels are similar to one another.

17. The apparatus of claim 12, wherein the processor is configured to update the recovered depth value of the first depth image using the second depth image having the recovered depth value such that the recovered depth value of the first depth image is consistent with the recovered depth value of the second depth image.

18. The apparatus of claim 17, wherein the processing unit is configured to update the recovered depth image of the first depth image by minimizing a Markov random field (MRF) energy of the first depth image having the recovered depth value iteratively based on the recovered depth value of the second depth image.

19. The apparatus of claim 11, wherein,
the first depth camera is configured to generate the first depth image by photographing a scene,
the second depth camera is configured to generate the second depth image by photographing the scene, and
the first depth camera and the second depth camera are configured to photograph the scene from at least one of different locations and different directions.

20. A method of processing a depth image, the method comprising:
receiving a first depth image and a second depth image, the first depth image indicating an estimated first distance between a first depth camera and an object, and the second depth image indicating an estimated second distance between a second depth camera and the object;
determining a number of mods (NoM) for a first pixel from the first depth image by minimizing a Markov random field (MRF) energy of the first depth image such that the determined NoM for the first pixel represents a number of periodic phase wrappings in the estimated first distance;
determining a NoM for a second pixel from the second depth image by minimizing a MRF energy of the second depth image such that the determined NoM for the second pixel represents a number of periodic phase wrappings in the estimated second distance;
recovering a depth value for the first pixel from the first depth image based on the determined NoM for the first pixel;
recovering a depth value for the second pixel from the second depth image based on the determined NoM for the second pixel; and
updating the recovered depth value for the first pixel based on the recovered depth value of the first depth image,
wherein the first and second pixels represent a same three-dimensional (3D) point.

21. The method of claim 20, wherein the minimizing a MRF energy of the first depth image comprises calculating a data cost by calculating the determined NoM of the first pixel which minimizes a distance between a first 3D point recovered by applying an NoM to the first pixel and a second 3D point recovered by applying an NoM to the second pixel.

22. The method of claim 20, wherein the updating the recovered depth value for the first pixel includes minimizing the MRF energy of the first depth image iteratively.

* * * * *